(12) United States Patent
Yae (10) Patent No.: US 12,483,748 B2
(45) Date of Patent: Nov. 25, 2025

(54) METHOD FOR MULTI-USE OF CONTENT, SYSTEM AND VEHICLE SUPPORTING THE SAME

(71) Applicants: HYUNDAI MOTOR COMPANY, Seoul (KR); Kia Corporation, Seoul (KR)

(72) Inventor: Seong Soo Yae, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/752,313

(22) Filed: Jun. 24, 2024

(65) Prior Publication Data
US 2025/0193486 A1    Jun. 12, 2025

(30) Foreign Application Priority Data
Dec. 7, 2023   (KR) .......................... 10-2023-0177098

(51) Int. Cl.
*H04N 21/436* (2011.01)
*H04N 21/414* (2011.01)
*H04N 21/43* (2011.01)

(52) U.S. Cl.
CPC ..... *H04N 21/436* (2013.01); *H04N 21/41422* (2013.01); *H04N 21/4302* (2013.01)

(58) Field of Classification Search
CPC ........... H04N 21/436; H04N 21/41422; H04N 21/4302
See application file for complete search history.

(56) References Cited

U.S. PATENT DOCUMENTS

| | | | | |
|---|---|---|---|---|
| 10,783,929 | B2 * | 9/2020 | Leyfman | G06F 3/165 |
| 11,259,069 | B1 * | 2/2022 | Hsieh | H04N 21/414 |
| 11,451,853 | B1 * | 9/2022 | Ansfield | H04N 21/6547 |
| 12,335,559 | B2 * | 6/2025 | Marten | H04N 21/4756 |
| 2004/0117480 | A1 * | 6/2004 | Karaoguz | H04N 21/26266 348/E7.071 |
| 2004/0117845 | A1 * | 6/2004 | Karaoguz | H04N 21/25808 348/E7.071 |
| 2012/0072954 | A1 * | 3/2012 | Karaoguz | H04N 21/6582 725/56 |
| 2012/0249806 | A1 * | 10/2012 | Gong | H04N 23/63 348/E5.045 |

(Continued)

FOREIGN PATENT DOCUMENTS

| | | | | |
|---|---|---|---|---|
| JP | 2023515325 A * | 4/2023 | ......... | H04N 21/4122 |
| KR | 101656871 B1 * | 9/2016 | ........... | H04N 21/242 |

(Continued)

*Primary Examiner* — Fernando Alcon
(74) *Attorney, Agent, or Firm* — Fish & Richardson P.C.

(57) ABSTRACT

A vehicle for supporting multi-use of content of a vehicle includes a memory to store the content, and a processor operatively connected to the memory. The processor collects multiple pieces of delay characteristic information of a plurality of output devices by performing a scan operation, if a request is made to reproduce the content stored in the memory, select, as a service group, a predetermined percentage of output devices, which satisfy a specific delay characteristic value, among the plurality of output devices, and transmit the content to the service group, a method for multi-use of the content of the vehicle, and a computing system using the same.

20 Claims, 9 Drawing Sheets

(56) References Cited

U.S. PATENT DOCUMENTS

| | | | | |
|---|---|---|---|---|
| 2015/0334441 | A1* | 11/2015 | Sukegawa | H04N 21/436 |
| | | | | 725/25 |
| 2016/0150011 | A1* | 5/2016 | Le Nerriec | H04N 21/242 |
| | | | | 709/205 |
| 2017/0289609 | A1* | 10/2017 | Liu | H04N 21/4394 |
| 2019/0306553 | A1* | 10/2019 | Iyer | H04W 84/18 |
| 2020/0107076 | A1* | 4/2020 | DeLuca | H04N 21/47217 |
| 2020/0183545 | A1* | 6/2020 | Kitson | H04L 65/612 |
| 2020/0296469 | A1* | 9/2020 | Wittke | H04N 21/8547 |
| 2020/0314539 | A1* | 10/2020 | Borowski | H04N 7/142 |
| 2023/0052385 | A1* | 2/2023 | Shah | H04N 21/2401 |
| 2023/0179838 | A1* | 6/2023 | Panchaksharaiah | |
| | | | | H04N 21/8106 |
| | | | | 386/241 |
| 2024/0223994 | A1* | 7/2024 | Singh | H04N 21/436 |
| 2024/0273580 | A1* | 8/2024 | Kolodziej | H04N 21/4302 |
| 2024/0298060 | A1* | 9/2024 | D'Amato | H04N 21/8113 |

FOREIGN PATENT DOCUMENTS

| | | | | |
|---|---|---|---|---|
| WO | WO-2017104578 A1 * | 6/2017 | | A63F 13/52 |
| WO | WO-2019093818 A1 * | 5/2019 | | H04N 21/482 |

\* cited by examiner

| DEVICE | Delay(ms) | Signal Strength(-dbm) | SERVICE TARGET GROUP | SERVICE GROUP |
|---|---|---|---|---|
| 12:12:12:12:12:12 | 200~700 | -20dBm | - | - |
| 23:23:23:23:23:23 | 200~500 | -30dBm | O | O |
| 34:34:34:34:34:34 | 300~600 | -30dBm | O | O |
| 45:45:45:45:45:45 | 400 | -10dBm | - | - |
| 56:56:56:56:56:56 | 350~800 | -80dBm | O | O |
| 78:78:78:78:78:78 | 500~800 | -40dBm | O | X |

METHOD FOR MULTI-USE OF CONTENT, SYSTEM AND VEHICLE SUPPORTING THE SAME

CROSS-REFERENCE TO RELATED APPLICATION

This application claims the benefit of priority to Korean Patent Application No. 10-2023-0177098, filed in the Korean Intellectual Property Office on Dec. 7, 2023, the entire contents of which are incorporated herein by reference.

TECHNICAL FIELD

The present disclosure relates to a technology for efficiently delivering content to output devices within a vehicle, and more particularly, to the output devices utilized by a plurality of users.

BACKGROUND

A vehicle is equipped with various systems to output content. For example, the vehicle is equipped with a system to reproduce content, which is received from an external electronic device through a communication circuit, in real time, as well as reproducing content stored in a memory. In addition, conventional vehicles can output content by connecting to a single wireless headset. Accordingly, a conventional vehicle system to output content has been mainly used for a passenger in a rear seat to independently hear streaming content. In addition, the conventional vehicle system to output content is configured to have a plurality of wireless communication chips to support the connection to a plurality of headsets. Accordingly, a vehicle having multiple seats is increased in costs and has a complex system structure, because chips are required by the number of passengers such that content hearing service is provided to all passengers inside the vehicle having the multiple seats.

SUMMARY

The present disclosure is directed to a method for multi-use of content, and a system and a vehicle for supporting the same, capable of supporting an environment allowing one source content to be viewed through a plurality of output devices, in relation to examples of the above-described technical conditions.

According to one aspect of the present disclosure, a vehicle for supporting multi-use of content can include a memory to store the content, and a processor operatively connected to the memory, and the processor can collect multiple pieces of delay characteristic information of a plurality of output devices by performing a scan operation, if a request is made to reproduce the content stored in the memory, select, as a service group, a predetermined percentage of output devices, which satisfy a specific delay characteristic value, among the plurality of output devices, and transmit the content to the service group.

In some implementations, the processor can determine signal strengths of the plurality of output devices, and select, as a service target group, output devices having signal strength greater than or equal to preset reference strength, and select the service group from the service target group.

In some implementations, the processor can select, as the specific delay characteristic value, the largest minimum value from among multiple pieces of delay characteristic information of the output devices belonging to the service target group, which is set in a range from the minimum value to the maximum value.

In some implementations, the processor can calculate a delay characteristic margin range value by applying a preset margin to the specific delay characteristic value, and calculate output devices having delay characteristic values including at least a portion of the delay characteristic margin range value.

In some implementations, the processor can reselect, as the specific delay characteristic value, the next largest minimum value among the multiple pieces of delay characteristic information, if a calculated percentage of the number of the output devices is less than a reference ratio.

In some implementations, the processor can transmit a decryption key to the output devices belonging to the service group and transmit the content in a streaming manner.

In some implementations, the processor can perform an operation of transmitting the content by selecting the service group, if the content is video content.

In some implementations, the processor can perform the operation of transmitting the content by selecting the service group, if an engine of the vehicle is turned on after being turned off, or if an input is received by a driver of the vehicle.

In some implementations, the processor can perform an operation of transmitting the content by selecting the service group, if a request is made to reproduce new video content.

In some implementations, the processor can perform the operation of transmitting the content by selecting the service group, if a passenger of the vehicle gets on or gets off.

According to another aspect of the present disclosure, a method for multi-use of content can include receiving, by a processor of a vehicle, a request to reproduce content stored in a memory, performing a scan operation to collect delay characteristic information of a plurality of output devices, if the request to reproduce the content stored in the memory is requested, selecting, as a service group, a predetermined percentage of output devices, which satisfy a specific delay characteristic value, among the plurality of output devices, and transmitting the content to the service group.

In some implementations, the method can further include determining signal strengths of the plurality of output devices, and selecting, as a service target group, output devices having signal strength greater than or equal to preset reference strength, and the selecting of the service group may be performed among the service target group.

In some implementations, the selecting of the predetermined percentage of output devices as the service group can include selecting, as the specific delay characteristic value, the largest minimum value from among multiple pieces of delay characteristic information of the output devices belonging to the service target group, which is set in a range from the minimum value to the maximum value.

In some implementations, the method can further include calculating a delay characteristic margin range value by applying a preset margin to the specific delay characteristic value, calculating output devices having delay characteristic values including at least a portion of the delay characteristic margin range value, and reselecting, as the specific delay characteristic value, the next largest minimum value among the multiple pieces of delay characteristic information, if a calculated percentage of the number of the output devices is less than a reference ratio.

In some implementations, the transmitting of the content can include transmitting a decryption key to the output devices belonging to the service group and transmitting the content in a streaming manner.

In some implementations, the transmitting of the content can include transmitting the content by selecting the service group, if the content is video content, and transmitting audio content to an entire portion of the service target group, if the content is audio content.

In some implementations, the collecting of the delay characteristic information can be performed if an engine of the vehicle is turned on after being turned off, if an input is received by a driver of the vehicle, or if a request is made to reproduce new video content, or if a passenger of the vehicle gets on or gets off.

According to another aspect of the present disclosure, a computing system of a vehicle can include a processor to support a vehicle operation, and a memory to store at least one instruction to operate the processor, and the at least instruction stored in the memory may cause the processor to receive, by the processor of the vehicle, a request to reproduce content stored in the memory, perform a scan operation to collect delay characteristic information of a plurality of output devices, if the request to reproduce the content stored in the memory is requested, select, as a service group, a predetermined percentage of output devices, which satisfy a specific delay characteristic value, among the plurality of output devices, and transmit the content to the service group.

In some implementations, the at least instruction may perform determining signal strengths of the plurality of output devices through the scan operation selecting, as a service target group, output devices having signal strength greater than or equal to preset reference strength, and selecting of the service group among the service target group.

In some implementations, the at least instruction may perform transmitting a decryption key to the output devices belonging to the service group, if transmitting the content.

DETAILED DESCRIPTION

In the following description, the present disclosure describes how stream data is provided from a single source device to multiple sinkers (headsets), addressing synchronization mismatches among output devices in relation to an intrinsic delay characteristic. These devices receive stream data and process sound for reproduction at varying time points, particularly relevant when viewing moving pictures. Hereinafter, implementations of the present disclosure will be described in detail with reference to FIGS. 1 to 6.

Figure 1:
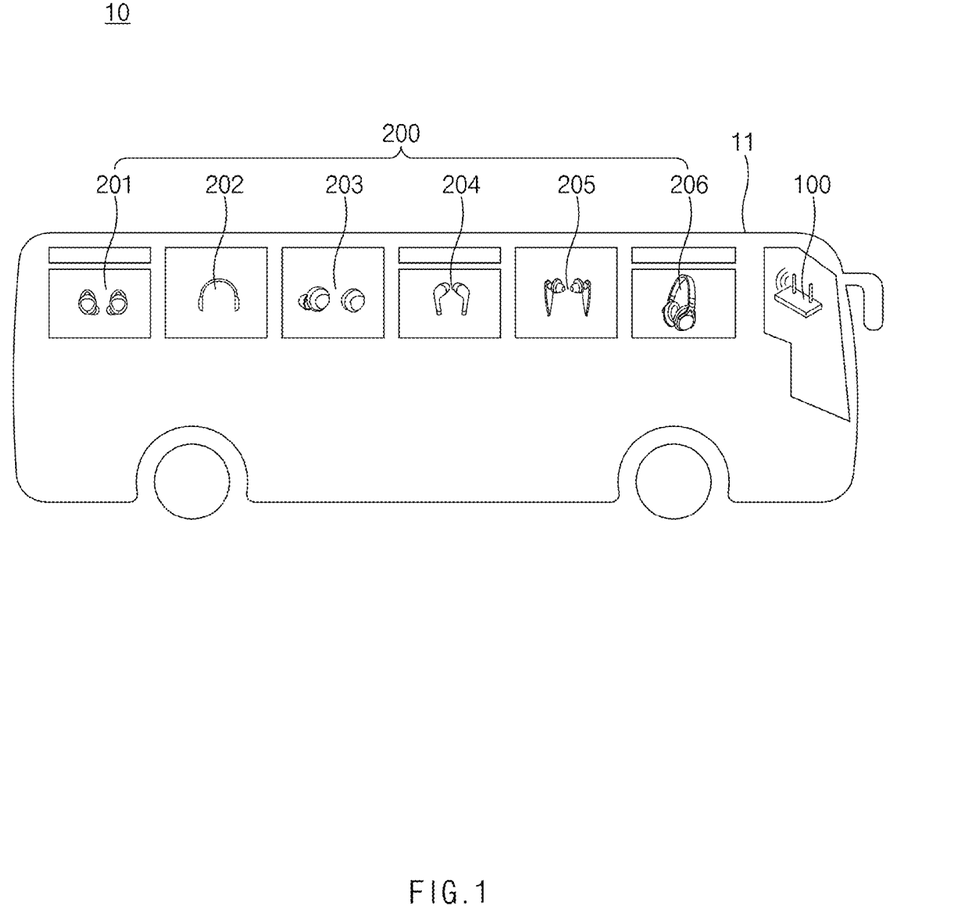
FIG. 1 is a diagram illustrating an example of a multi-use environment of content.

FIG. 1 is a diagram illustrating an example of a multi-use environment of content.

Referring to FIG. 1, a multi-use environment 10 of content can include a vehicle 11 and a plurality of output devices 200 positioned within a specific range from the vehicle 11. In some implementations, at least some of the plurality of output devices 200 may be positioned outside the vehicle.

The plurality of output devices 200 can include a device configured to receive at least some of content, which is output from the vehicle 11, under a specific condition. For example, at least some of plurality of output devices 200 can include a wireless headset or wireless earset different in at least one of an outer appearance or a delay characteristic. For example, a delay characteristic of a first output device 201 may be different from a delay characteristic of a second output device 202. In addition or alternatively, the first output device 201, a third output device 203, and a fourth output device 204 may have the same delay characteristic and remaining output devices (for example, the second output device 202, the fifth output device 205, and the sixth output device 206) may have different delay characteristics. In some implementations, although the first 201 to sixth output devices 206 are different from each other with respect to the maximum and minimum delay characteristics, the first 201 to sixth output devices 206 can have a common display driving circuit range. For example, as the delay characteristic of the first output device 201 is in the range of 300 ms to 500 ms, and the delay characteristic of the sixth output device 206 is in the range of 250 ms to 450 ms, the first output device 201 and the sixth output device 206 can have a common delay characteristic range of 300 ms to 450 ms. At least some of the plurality of output devices 200 can receive (for example, receiving in a streaming manner) content output from the vehicle 11 based on the delay characteristic. In addition, remaining output devices of the plurality of output devices may not receive the content from the vehicle 11 or may be delayed in reproduction even though the remaining output devices receive the content from the vehicle 11. In some implementations, the plurality of output devices 200 are all configured to receive and output the content output from the vehicle 11. The plurality of output devices 200 can establish a communication channel with the vehicle 11 or can receive a streaming service transmitted from the vehicle 11, depending on whether a passenger is inside the vehicle 11 or whether the vehicle 11 approaches specific communication coverage. Accordingly, a specific output device of the plurality of output devices 200 may not receive the content output from the vehicle 11, if the specific output device is spaced apart from the vehicle 11 by a specific distance. In some implementations, the plurality of output devices 200 can be grouped into an output device group to receive the content output from the vehicle 11. At least one output device belonging to the output device group may be excluded depending on the control of the vehicle 11, and a new output device may be added to the output device group.

The vehicle 11 can include a vehicle body for at least one of a driver or a passenger, a plurality of wheels to move the vehicle body, a driving device to generate driving force to drive the plurality of wheels, at least one shaft to transmit the driving force generated from the driving device to the plurality of wheels, a steering device for the steering of the vehicle 11, and a brake system to adjust the speed of the vehicle 11. In particular, the vehicle 11 can include a vehicle control device 100 (or a computing device, a computing system, a control device, a motor control unit, or a vehicle control device for the vehicle) to support a function of multiplying outputting content, after the engine of the vehicle 11 is turned on.

In some implementations, the plurality of output devices 200 (for example, headsets) can have an intrinsic delay characteristic for processing a sound. For example, a rate for processing the sound is different for each of the plurality of output devices 200. Accordingly, users may hear the sound with mutually different synchronization, if the plurality of output devices 200 are connected to the vehicle 11. The plurality of output devices 200 have different design specifications and different manufacturers in hardware or software depending on products, regardless of whether one chip or several chips are used for the vehicle. Accordingly, the plurality of output devices 200 may be manufactured with different intrinsic delay characteristics. Accordingly, if at least two passengers enter the vehicle, or as the number of passengers is gradually increased, the passengers may hear a sound at mutually different time points through mutually different output devices 200. For example, if a passenger views a video, a sound may not be synchronized with an image. The present disclosure proposes a method for enabling multiple passengers to reliably utilize content by adjusting the delay characteristics of the plurality of output devices 200 having various attributes (delay characteristics). This adjustment ensures stability when the vehicle 11 is connected to the plurality of output devices 200, providing the same streaming service to several passengers. In some implementations, the vehicle control device 100 can perform delay synchronization right before reproducing content, select devices for receiving hearing authority (deciphering key) depending on attributes, and can transmit a sound from the source in a broadcasting manner. Accordingly, the selected output devices 200 can reproduce the sound by processing the sound with a delay report value received from the source.

Figure 2:
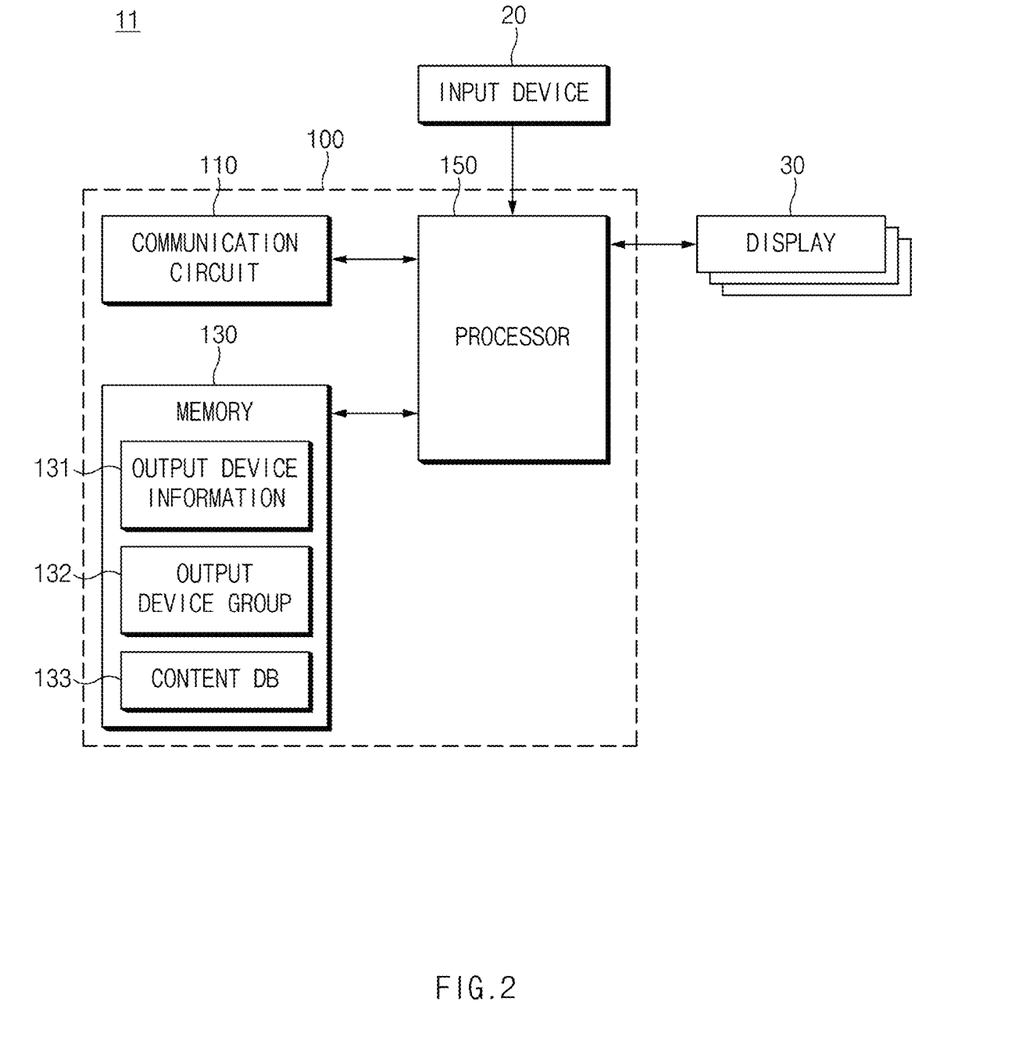
FIG. 2 is a diagram illustrating an example of components of a vehicle configuration.
Figure 3:
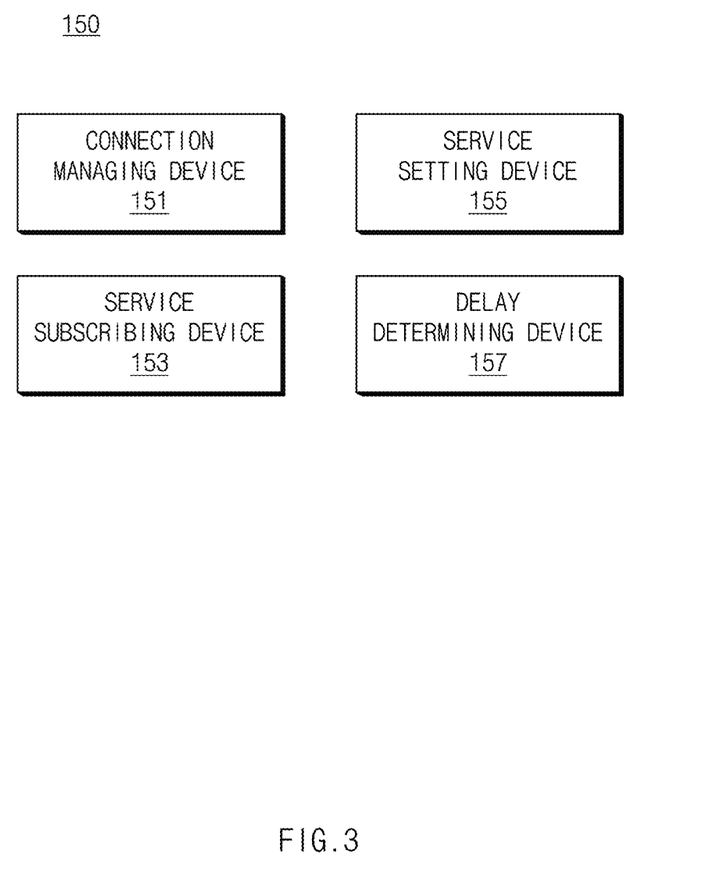
FIG. 3 is a diagram illustrating an example of output devices configured to detect signal strength.
Figure 4:
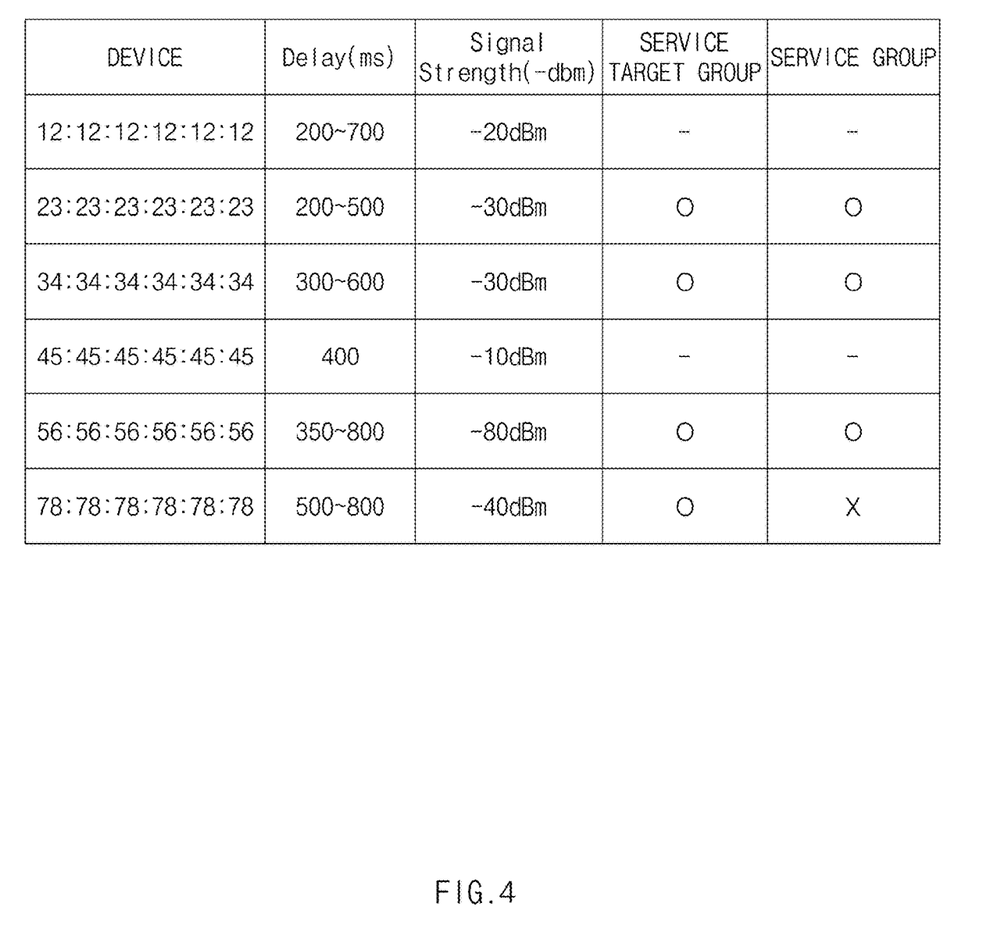
FIG. 4 is a diagram illustrating an exemplary selection process of an output device.
Figure 5:
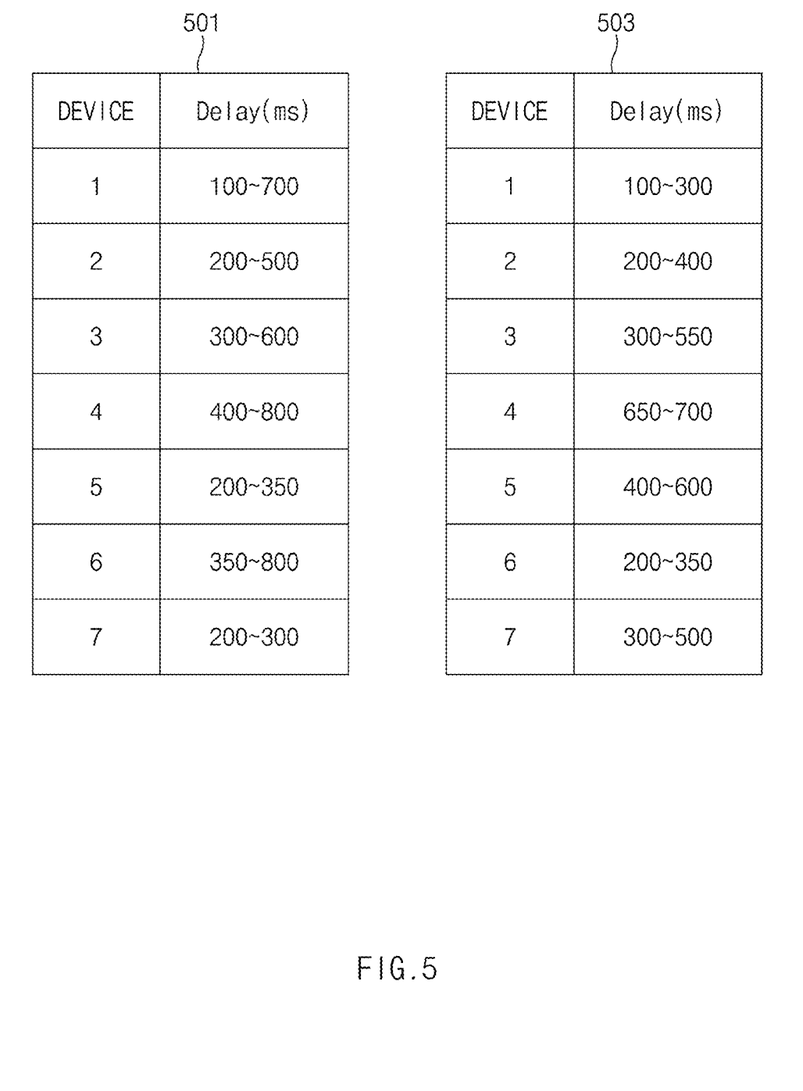
FIG. 5 is a diagram illustrating an exemplary selection process of a service group.

FIG. 2 is a diagram illustrating an example of components of a vehicle configuration, FIG. 3 is a diagram illustrating an example of output devices configured to detect signal strength, and FIG. 4 is a diagram illustrating an exemplary selection process of an output device. FIG. 5 is a diagram illustrating an exemplary selection process of a service group.

Referring to FIG. 2, the vehicle 11 can include the vehicle control device 100, an input device 20, and a display 30. In some implementations, the vehicle 11 can further include a vehicle body, a plurality of wheels, a driving device, at least one shaft, gears, a steering device, and a brake system, as described above, and can further include various electrical systems. For example, the vehicle 11 can further include a power supply and a wiring to transmit power of the power supply to each component of the vehicle 11, at least one sensor to collect various sensing information related to the operation of the vehicle 11, and devices (for example, an air conditioning device, a heating device, a seat adjusting device, and a getting-in/out support device) that control the environment of the vehicle depending on the collected sensor information.

The input device 20 can include a device to generate at least one input signal related to the operation of the vehicle 11. For example, the input device 20 can generate an input signal related to a function (or a content multi-use function) of the multi-use of the content. In this regard, the input device 20 can include at least one of at least one input button, an input stick, a voice input device, a touch screen, a touch pad, or a gesture input device disposed in the vehicle 11. The input device 20 can generate, in response to a driver operation or a passenger operation, at least one input signal for requesting the reproduction of at least one content included in a content DB 133 of a memory 130, an input signal for requesting the end of content reproduced, an input signal for requesting at least one output device, which is searched, to belong to an output device group 132 allowing the use of the content, or an input signal for excluding at least one output device included in the output device group 132 from the output device group and transmit the generated input signal to a processor 150.

The display 30 can output at least one screen related to the operation of the vehicle 11. For example, the display 30 can output a current driving state of the vehicle 11, a moving speed of the vehicle 11, or a navigation screen related to the movement of the vehicle 11. In addition or alternatively, the display 30 can output a screen (content reproducing screen) for reproducing content, which is selected by an input signal, from the content DB 133 of the memory 130. For example, the display 30 can output a navigation screen, split the screen if content is requested to be reproduced, and simultaneously output a navigation screen and the content reproducing screen on the split screen. If the reproduction of the content is finished, the display 30 can fully output the navigation screen. A plurality of displays 30 may be provided in the vehicle 11. For example, the vehicle 11 can include the plurality of displays 30 disposed in seats, which are provided in the vehicle 11, respectively. At least one display 30 can be provided at a specific position, for example, on a wall surface or the ceiling of the vehicle 11. In the situation on which a plurality of displays 30 are provided in the vehicle 11, the displays 30 can simultaneously output the content reproducing screen.

The vehicle control device 100 can perform a control operation related to the control of the operation of the vehicle 11. For example, the vehicle control device 100 can control the speed or direction of the vehicle 11 depending on the operation of a steering device or a speed controlling device. In some implementations, the vehicle control device 100 can control an attribute for reproducing audio content with respect to the plurality of output devices 200. In this regard, the vehicle control device 100 can include a communication circuit 110, the memory 130, and the processor 150.

The communication circuit 110 can support a communication function of the vehicle 11. For example, the communication circuit 110 can establish a communication channel between the vehicle control device 100 and peripheral components, for example, the input device 20, the display 30, and the memory 130. In this regard, the communication circuit 110 can establish a wired communication channel connecting the vehicle control device 100 to the peripheral components. In addition, the communication circuit 110 can establish the communication channel with at least one output device among the plurality of output devices 200. In addition, the communication circuit 110 can transmit at least a portion of a video signal and an audio signal of the content, which is selected by the input signal (or scheduling information), among multiple contents stored in the content DB 133. For example, the communication circuit 110 can transmit the video signal of the content to the displays 30 in a wired manner, and transmit the audio signal of the content in a broadcasting manner.

The memory 130 can store various data necessary for the operation of the vehicle 11. For example, the memory 130 can store a storage value of a seat posture state of the vehicle 11, a driving record of the vehicle 11, map information related to the driving of the vehicle 11, and a navigation program. For example, the memory 130 can include output device information 131, the output device group 132, and a content DB 133 in relation to support for the content multi-use function of the present disclosure. The output device information 131 can include device information obtained from the plurality of output devices 200 as the processor 150 of the vehicle control device 100 searches for the surroundings. For example, the output device information 131 can include information corresponding to the number of the plurality of output devices 200 disposed in the vehicle 11, and the device information corresponding to each of the output devices 200 can include the type of the output device 200, identification information of the output device 200, and delay characteristic information of the output device 200. The output device group 132 can include information obtained as at least some output devices for receiving an audio signal of the currently reproduced content, among the collected output device information 131. For example, if ten output devices are provided in the vehicle 11, the output device group 132 can include at least one output device and less than 10 output devices depending on the attributes (for example, delay characteristics) of each output device. The output device group 132 can be updated whenever new content is reproduced, or at least at one time point (for example, a time point in which a passenger gets on or off, a notification of the destination is made, an engine is turned on/turned off, the operation by the driver or a specific passenger occurs), related to the operation of the vehicle 11. The content DB 133 can include various pieces of content to be reproduced to correspond to the control of the processor 150. For example, the content DB 133 can include video content including a video and an audio, and audio content including only an audio. The content DB 133 may be updated depending on a driver operation or a passenger request. If the content DB 133 is updated, the content DB 133 can be updated based on content received from an external server device (for example, a server device providing content) through the communication circuit 110 to correspond to the control of the processor 150.

The processor 150 can control to transmit or process a signal related to the operation of the vehicle 11, store a processing result, or output various signals related to the operation of the vehicle 11. For example, the processor 150 can receive a delay attribute value (synchronization characteristic detected) and signal strength (a distance allowing a service determined) from the plurality of output devices 200 (for example, headsets) registered in the vehicle 11. Regarding the registration of the plurality of output devices 200, in an initial pairing, devices present in a registration device list (for example, the output device information 131) and registered devices in the distance allowing communication may be classified into a service target group (for example, the output device group 132). The output device group 132, which is a group of devices to receive a streaming service among the service target groups, can include a group of headsets allowing a streaming service currently being reproduced. The processor 150 can determine whether to support synchronization with the output devices 200 belonging to the output device group 132, depending on the characteristic (audio/video) of the sound source selected from the vehicle 11. For example, regarding the support of the source service, the processor 150 can transmit an audio signal to all output devices 200 (for example, headsets) registered in the output device information 131, without delay-synchronization. Regarding the support of the video service, the processor 150 can perform delay synchronization to transmit an audio signal only to the output devices 200 to which the delay function is applied, and additionally provide a video signal corresponding to the audio signal to the display 30 in the vehicle 11, or transmit the video signal to the display device of the output devices 200. As described above, a video service requiring delay synchronization can perform synchronization based on the delay attribute of the headset grouped into the service group. The processor 150 can search a device, which is activated, for the output device information 131 whenever the content is changed, and include the found new output device in the output device group 132. In the process of reproducing content, the processor 150 can change a device (for example, an output device) for hearing the streaming service, depending on a situation at a time point at which each content is reproduced, depending on the attributes of the content. In this regard, the processor 150 can include a connection managing device 151, a service subscribing device 153, a service setting device 155, and a delay determining device 157.

If the plurality of output devices 200 request connection to the vehicle 11, the connection managing device 151 may determine the delay value of the plurality of output devices 200, and scan the surrounding to search for the plurality of output devices 200 currently preset around the vehicle 11 to store signal strength information. In this process, the connection managing device 151 may distinguish output devices having specific signal strength or more and an output device having less than the specific signal strength. The output devices having the specific signal strength or more may be stored, as the service target group, in the output device group 132 of the memory 130. The connection managing device 151 may transmit a wireless detection signal continuously or in a specific period to the output devices registered in the output device group 132, and receive a response to the wireless detection signal such that the signal strength is re-determined. Accordingly, the connection managing device 151 determines whether the output devices, which is able to be connected, may be maintained be in a state allowing connection. The connection managing device 151 may maintain the registered state of the output device group 132 with respect to the output device maintained to be in the state allowing connection, and delete the output device, which is out of the state allowing connection, from the output device group 132.

Referring to FIG. 4, the connection managing device 151 may receive a response signal for detecting delay characteristic information and signal strength, from six output devices through a scan operation. Meanwhile, although the drawing illustrates the information response of six output devices, the present disclosure is not limited thereto. For example, the number of devices (or output devices) displayed in FIG. 4 may vary depending on the number of output devices positioned around the vehicle 11. For example, the connection managing device 151 may collect information on a first output device (12:12:12:12:12:12) having the delay characteristic in the range of 200 ms to 700 ms and signal strength (−dBm) of −20 dBm, a second output device (23:23:23:23:23:23) having the delay characteristic in the range of 200 ms to 500 ms and signal strength (−dBm) of −30 dBm, a third output device (34:34:34:34:34:34) having the delay characteristic in the range of 300 ms to 600 ms and signal strength (−dBm) of −30 dBm, a fourth output device (45:45:45:45:45:45) having the delay characteristic of 400 ms and signal strength (−dBm) of −10 dBm, a fifth output device (56:56:56:56:56:56) having the delay characteristic in the range of 350 ms to 800 ms and signal strength (−dBm) of −80 dBm, and a sixth output device (78:78:78:78:78:78) having the delay characteristic in the range of 500 ms to 800 ms and signal strength (−dBm) of −40 dBm. The connection managing device 151 may exclude the first output device (12:12:12:12:12:12:12) and the fourth output device (45:45:45:45:45:45) from the service target group and the service group, based on a predefined reference (for example, at least −20 dBm). Meanwhile, the connection managing device 151 may add the second output device (23:23:23:23:23:23), the third output device (34:34:34:34:34:34), a fifth output device (56:56:56:56:56), and a sixth output device (78:78:78:78:78:78), which have values less than or equal to reference signal strength which is previously defined, to the service target group.

The service subscribing device 153 may determine whether the output devices connected are suitable for a streaming service, based on the attributes of the connected output devices. Even if all output devices connected in a pairing mode of the vehicle 11 are assumed as being subscribed form the streaming service, the specific output device fails to receive a service for each attribute of 'delay report'. In this regard, the service subscribing device 153 may store and manage delay characteristic information corresponding to a service factor and output devices (for example, output devices included in the output device information 131) belonging to the service target group. The service subscribing device 153 may store a delay report value (for example, non-support, support+fixed value, support+variable range setting) for each output device included in the output device information 131 and share the delay report value with the service setting device 155. For example, the service subscribing device 153 may select only output devices having the specific signal strength or more (obtained by receiving the signal received from the output devices and measuring the signal characteristic) as the service target group. For example, the service subscribing device 153 may set only output devices within the distance of 12 m as receiving the service. The distance of 12 m may be a distance to, for example, a specific headset, and the distance may be shorter or longer. The service group may be changed depending on the attribute of the output devices of the service target group. According to the present disclosure, the function of providing the audio content based on the synchronization may include a broadcasting media service provided to at least one output device, which satisfies a specific condition, among devices registered in the output device group 132.

The service setting device 155 may set a service to a video service or an audio service, depending on the characteristic of an application, that is, depending on whether the mode set in the vehicle 11 is a video support mode or an audio exclusive mode. With regard to such setting, the service setting device 155 may determine the setting mode whenever the content is selected. If the mode of the service is set, the service setting device 155 may transmit the mode value to the delay determining device 157 for delay setting. The service setting device 155 may receive the determined delay value (DelayReq) and the list of devices satisfying the delay value, from the delay determining device 157, and may update a service group to provide service, among the output device group 132 based on the received list. In this case, the DelayReq value may be transmitted to output devices in all service groups, and specific guide information may be transmitted to the output devices which fail to belong to the service group of the service target group. For example, the specific guide information may include information of "the relevant output device fails to provide an image synchronization service, and information requesting to "change to another output device if you want to receive service", as guide sound sources transmitted to the output devices failing to receive the delay synchronization service, if the content selected by the vehicle 11 is a video. In addition, the service setting device 155 may support that the above-described guide information is output through the display, if the vehicle 11 includes a display allowing the viewing of the passenger. In addition, the service setting device 155 may transfer a selection authority about the viewing of the content through the display. For example, the service setting device 155 may transmit an inquiry of asking "whether to terminate a service" to an output device (or a display corresponding to a passenger using the output device) which is not synchronized in an audio if viewing content due to the mismatching of the delay characteristic. Then, if the passenger selects a "use" option of a "termination" option and the "use" option, the service setting device 155 transmits the audio content (for example, the decryption key) to the output device to provide, for the passenger, an opportunity of viewing even content mismatched in synchronization between the image and the audio.

If receiving the mode value from the service setting device 155, the delay determining device 157 may recognize the mode value as be to reproducing new content and set a delay value for selecting output devices to receive a sound source of content to be reproduced. Meanwhile, the manner for setting the delay value may vary depending on the service mode. If the delay value (DelayReq) is determined, the delay determining device 157 may transmit the determined delay value to the service setting device 155. For example, if the service mode is an audio mode, the delay determining device 157 may not set the Delay value additionally.

The service setting device 155 may support transmitting the decryption key to all service target groups (for example, output devices having the specific signal strength or more) set by the service subscribing device 153 such that all service target groups receive the streaming service. In other word, if the audio service is provided, the service setting device 155 may provide the audio streaming service to a device to support the 'delay report' value, a device not to support the 'delay', a device having a fixed value even though supporting the 'delay', and a device to variably support the 'delay', without the distinction between the above devices.

If the service mode is the video mode, the delay determining device 157 may select the largest 'Dmin' value (a value having the minimum delay characteristic or a fixed delay value) among the minimum delay characteristics of the output devices belonging to the service target group to maximize the service group. Accordingly, the delay determining device 157 supports selecting output devices belong to the service target group having a higher delay characteristic than an output device having the slowest delay performance. In this regard, the delay determining device 157 may determine whether the 'Drin' value (a value having the minimum delay characteristic) is included in the 'delay' change value for the devices belonging to the service target group. In general, the delay value perceived by an average person or a normal person is known to be about 100 ms or more. Accordingly, the delay determining device 157 may set a 'Dmar' (delay margin) value to be within 100 ms. According to the present disclosure, the 'Dmar' value may be set to 50 ms. In the comparison process of determining whether the 'Dmin' value falls within the delay change value range of the devices belonging to the service target group, the delay determining device 157 may compare the value 'Dmar' (delay margin value) throughout the range from a positive (+) value to a negative (−) value). For example, if the 'Dmin' value is 200, the delay determining device 157 may determine whether the delay characteristic of the output device satisfies the range of 150 ms to 250 ms.

With respect to the initially applied 'Dmin' value, if at least a specific percentage (for example, at least 51%; at least 51% may be changed 30%, 40%, or 60% depending on cases) of devices among all output devices belonging to the service target group are not satisfied, the delay determining device 157 may reset the 'Dmin' value to a 'Dmin' value of the output device having the second smallest 'Dmin' value among the output devices belonging to the service target group. The delay determining device 157 may repeatedly perform the above-described operation until at least 51% of the devices are satisfied. If the 'Dmin' value satisfying at least a specific percentage of devices among all output devices is determined, the delay determining device 157 may transmit a list of the output devices satisfying the determined 'Dmin' value to the service setting device 155.

Referring to reference numeral 501 of FIG. 5 regarding the above description, the delay determining device 157 may set the 'DelayReq' value, and may select an output device (for example, the 'Dmin' value of the output device having 400 ms) having the largest 'Dmin' value. If the delay margin is set to 50 ms, the delay determining device 157 may designate output devices having a delay characteristic including a range of 350 ms to 450 ms as being in a service group. In this case, the delay margin of 50 ms may be changed to a different value, for example, 30 ms, 40 ms, 60 ms, 70 ms, 80 ms, 90 ms, or 99 ms in response to the setting of the driver of the vehicle 11 or the request by a passenger. Referring to reference numeral 501 of FIG. 5, the delay determining device 157 may select output devices satisfying the above condition (for example, a condition for selecting an output device having a delay characteristic in the range of 350 ms to 450 ms). Accordingly, a seventh device (for example, an output device having the delay characteristic in the range of 200 ms to 300 ms) may be excluded from the service group. The delay determining device 157 may transmit a list including remaining devices except for the seventh output device to the service setting device 155. Accordingly, the service setting device 155 may transmit the decryption key to the output devices belonging to the service group and may transmit the content in a streaming manner. The output devices belonging to the service group may receive an decryption key value, receive content transmitted in the streaming manner, decrypt the content using the decryption key, and then reproduce the content.

For another example, referring to reference number 503 of FIG. 5, the delay determining device 157 sets the 'DelayReq' value, and may select a fourth output device (for example, an output device having the largest 'Dmin' value of 650 ms) among the delay characteristics of the collected output devices. If the delay margin is set to 50 ms, the delay determining device 157 may search for output devices having a delay characteristic within a range of 600 ms to 700 ms. Referring to reference number 503, devices including the delay characteristic in the range of 600 ms to 700 ms correspond to the fourth output device and a fifth output device, which fails to satisfy the specific percentage of output devices described above. If the percentage of the output devices is not satisfied, the delay determining device 157 may select the fifth output device having a next ranking 'Dmin' value, apply a delay margin to 400 ms, which is the 'Dmin' value of the fifth output device, to search for an output device having a delay characteristic in the range of 350 ms to 450 ms. For example, the delay determining device 157 may determine that the fifth to seventh output devices are output devices satisfying the corresponding condition. The delay determining device 157 may transmit a list including remaining output devices except for the fourth output device to the service setting device 155. The service setting device 155 may transmit the decryption key to the first to third output devices and the fifth to seventh output devices and transmit the content in the streaming manner.

Figure 6:
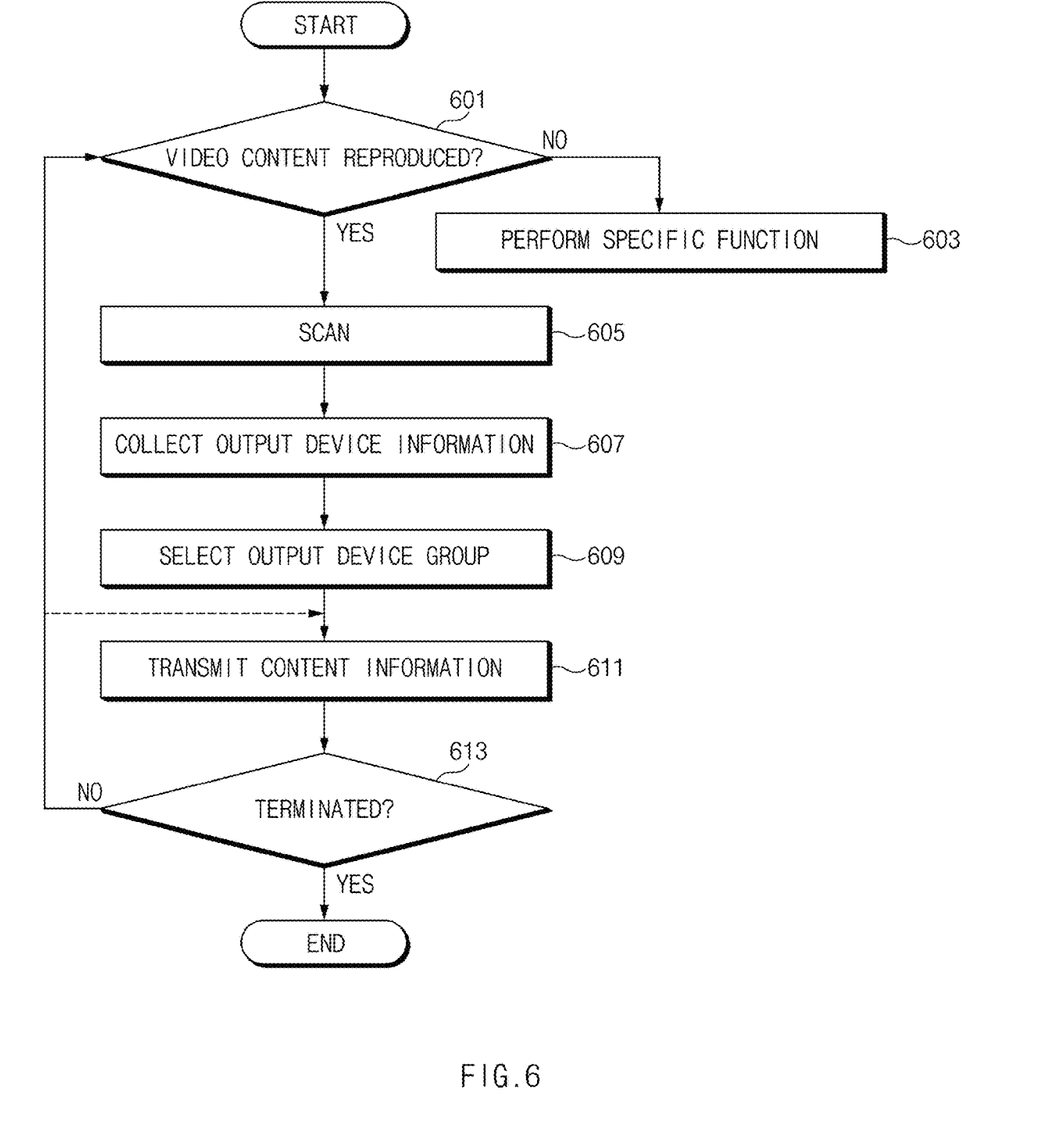
FIG. 6 is a diagram illustrating an example of a method for multi-use of content, as video content is reproduced.

FIG. 6 is a diagram illustrating an example of a method for multi-use of content as video content is reproduced.

Referring to FIG. 6, regarding the method of multi-using video content as the video content is reproduced, the processor 150 of the vehicle control device 100 can determine whether an input for a request for reproducing video content in 601. The input for the request for reproducing the video content may be automatically performed if the engine of the vehicle 11 is turned on. Alternatively, the input for the request for reproducing the video content may be made by a driver driving the vehicle 11. If the input made by the driver (or scheduled information) is not the input for request for reproducing the video content, the processor 150 may perform a specific function based on the input. For example, if the input is an input for a request for reproducing audio content, the processor 150 may control to reproduce audio content and transmit the reproduced audio content in the streaming method.

If the input for the request for reproducing the video content occurs, in operation 605, the processor 150 may perform a scan operation. For example, the processor 150 may transmit a message for requesting delay characteristic information to output devices within a specific range around the vehicle 11. In operation 607, the processor 150 may receive the delay characteristic information from the output devices, and store and manage the received delay characteristic information.

In operation 609, the processor 150 may select an output device group from the collected output devices information. In this process, as described in FIGS. 4 and 5, the processor 150 may select output devices within the signal strength, which is previously defined, as a primary candidate group, and select output devices, which has delay characteristics satisfying the reference condition, from the primary candidate group, as the service group. The reference condition may include a delay characteristic allowing output devices belonging to the searched primary candidate group may be selected at a specific percentage or more. If a service group satisfying the reference condition is selected, in reference numeral 611, the processor 150 may transmit content information. For example, the processor 150 may individually transmit the decryption key to output devices belonging to the service group, and transmit an audio signal corresponding to the video content in the steaming manner.

In operation 613, the processor 150 may check whether a termination-related event occurs. If the termination-related event occurs, the processor 150 may stop reproducing and transmitting video content. If there is no separate termination-related event, the processor 150 may branch to before operation 601 and perform the following operation again.

Figure 7:
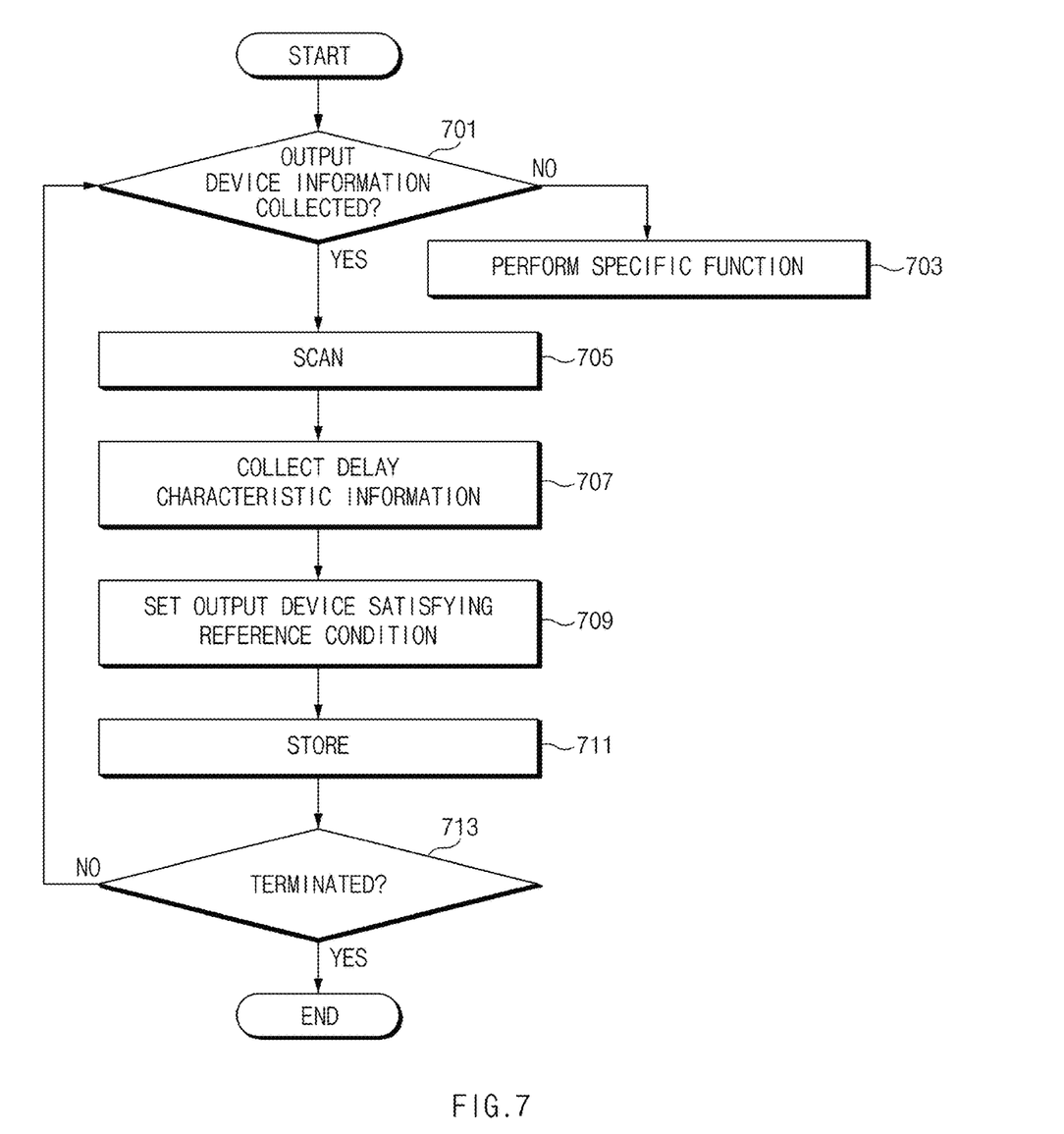
FIG. 7 is a diagram illustrating an example of a method for setting output devices by a vehicle control device related to the method for multi-use of content.

FIG. 7 is a diagram illustrating an example of a method for setting output devices by a vehicle control device related to the method for multi-use of content.

Referring to FIG. 7, in relation to the method of setting output devices, the processor 150 of the vehicle control device 100 can check whether an event requesting collection of output device information has occurred in operation 701. The event may include, for example, a driver input of the vehicle 11 requesting collection of output device information, the start of the vehicle 11 is turned on, or a new video content start is requested after a specific video content is terminated. Additionally or alternatively, the processor 150 may determine that an event requesting collection of output device information is generated if at least one output device transmits and receives a signal that may check the signal strength at a predetermined period with output devices held by passengers in the vehicle 11. Alternatively, if the vehicle 11 is a bus, the processor 150 may determine that an event for a request for collecting the output device information occurs if a change occurs in the entrance or exit of vehicle 11. If the specific event is not related to the event for a request for collecting the output device information, the processor 150 may process performing a specified function in operation 703. For example, the processor 150 may control to play and output audio content, receive (or download) content from an external server device by accessing an external server device that provides content, or maintain a previously ongoing work state according to the received event type.

If an event for a request for collecting occurs, the processor 150 may perform the scan operation in operation 705. Regarding the scan operation, the processor 150 may control to write a predefined message and transmit the predefined message in a broadcasting manner. Accordingly, the processor 150 may collect response information (for example, including delay characteristic information) to the message from the output devices, and temporarily store the collected response information in the memory 130. If the response information of the output devices is received, in operation 707, the processor 150 may collect delay characteristic information of each output device from the response information. In this process, the processor 150 may determine the signal strength of the response information, define a service target group based on response information having signal strength greater than or equal to a specific reference, and collect the delay characteristic information of output devices belonging to the service target group.

In operation 709, the processor 150 may set an output device group satisfying the reference condition. For example, the processor 150 may select an output device having the largest minimum delay characteristic value (Dmin) from the service target group, apply a margin to the delay characteristic value of the selected output device, and determine whether the percentage of output devices having the margin-applied delay characteristic value is greater than or equal to a predefined reference percentage (for example, 51%) based on all output devices. The processor 150 may set an output device group (or service group) for output devices greater than or equal to the predefined reference percentage.

If the output device group to provide the service is set, in operation 711, the processor 150 may store and manage a list of corresponding output devices in the memory 130. Additionally, the processor 150 may provide a key for decryption to output devices included in the list.

In operation 713, the processor 150 may confirm the occurrence of the event for the request for terminating the operation related to collecting the output device information. If an event for terminating the operation occurs, the operation of collecting the related information may be terminated. For example, the processor 150 may terminate collecting the output device information, if the reproduction of the video content is terminated, or any passenger is absent in the vehicle 11. If a termination event does not separately occur, the processor 150 may re-perform the operation after operation 701 based on a predefined period or as the event for collecting the output device information described above.

Figure 8:
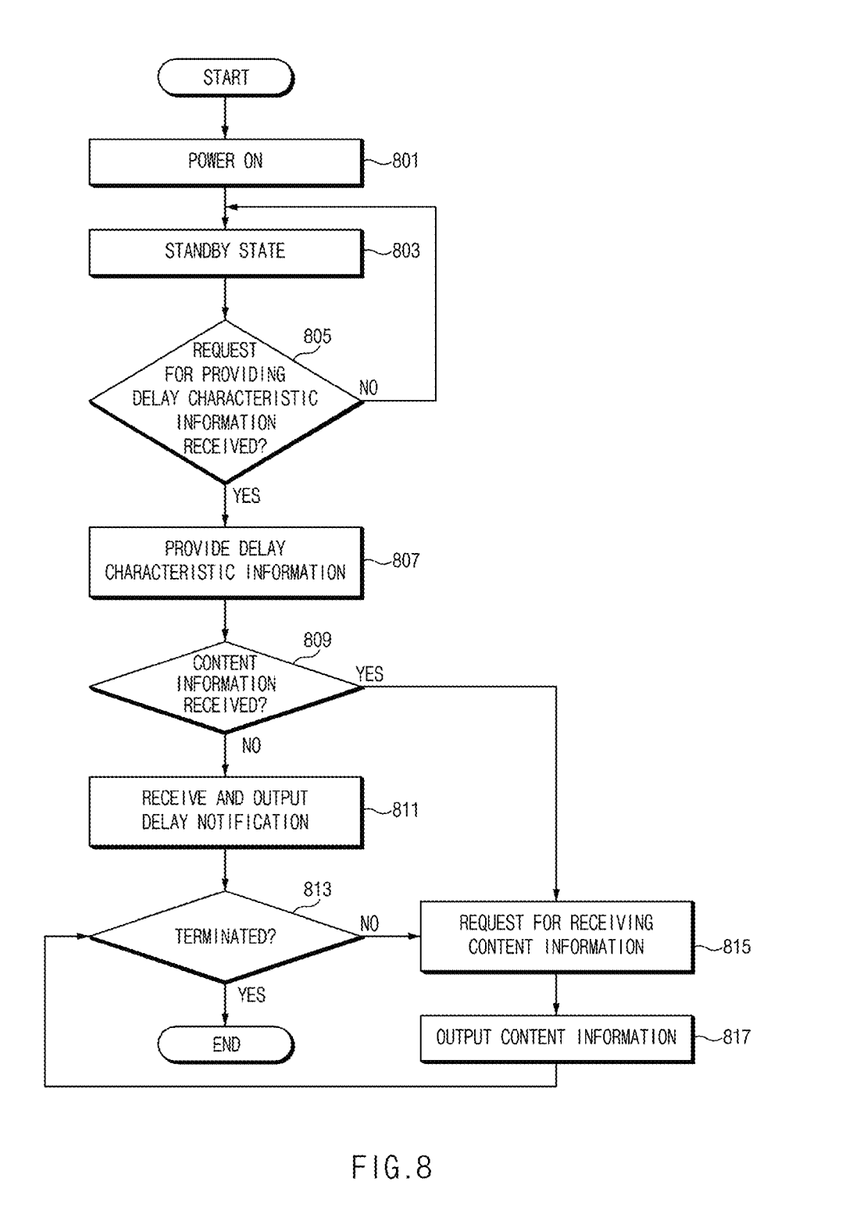
FIG. 8 is a diagram illustrating an exemplary process for using output devices related to the method of multi-use of the content.

FIG. 8 is a diagram illustrating an example of a method for using output devices related to the method of multi-use of the content.

Referring to FIG. 8, regarding the method of using output devices, in operation 801, a controller of at least one output device (hereinafter, described based on one output device control device) may control the turn-on of the output device according to a user operation and may be in a standby state in operation 803.

In operation 805, the controller of the output device may determine whether a message for a request for providing delay characteristic information is received. If the message is not separately received, the procedure is returned to operation 803 and maintained in a standby state or power is turned off in response to the operation of a user.

If the message for the request for providing the delay characteristic information is received, the controller of the output device may provide the delay characteristic information to the vehicle control device 100 of the vehicle 11 in operation 807.

Next, in operation 809, the controller of the output device may receive a message for asking whether to receive content information (for example, audio content). If the delay characteristics of an output device are different from delay characteristics of surrounding devices and thus the output device is a first output device failing to belonging to the service group, the first output device may receive a delay notification as in operation 811 in addition to receiving the message for asking whether to receive the content information. In this case, the controller of the first output device may output the received delay notification information on the display. The delay notification may include, for example, information for notifying that the first output device is able to receive audio content having a different delay characteristic from the delay characteristics of the surrounding second output device. Thereafter, the controller of the first output device may determine whether the terminating event (for example, an event for turning off the output device of the user) occurs in operation 813, and the first output device may be turned off if the terminating event occurs. If it is desired to receive audio content even if a delay occurs, the controller of the first output device may request the vehicle control device 100 of the vehicle 11 to receive content information in operation 815, depending on the user control. If the vehicle control device 100 provides audio content, the first output device may output content information in operation 817, but may output audio content including a specific delay. The audio content received by the first output device may be, for example, audio content that is not synchronized (or delayed) with the image of the display included in the vehicle 11.

Meanwhile, in operation 809, a second output device receiving a message for asking whether to receive content information may transmit a request for receiving content information to the vehicle control device 100 in operation 815, and receive and output normal content information from the vehicle control device 100.

Figure 9:
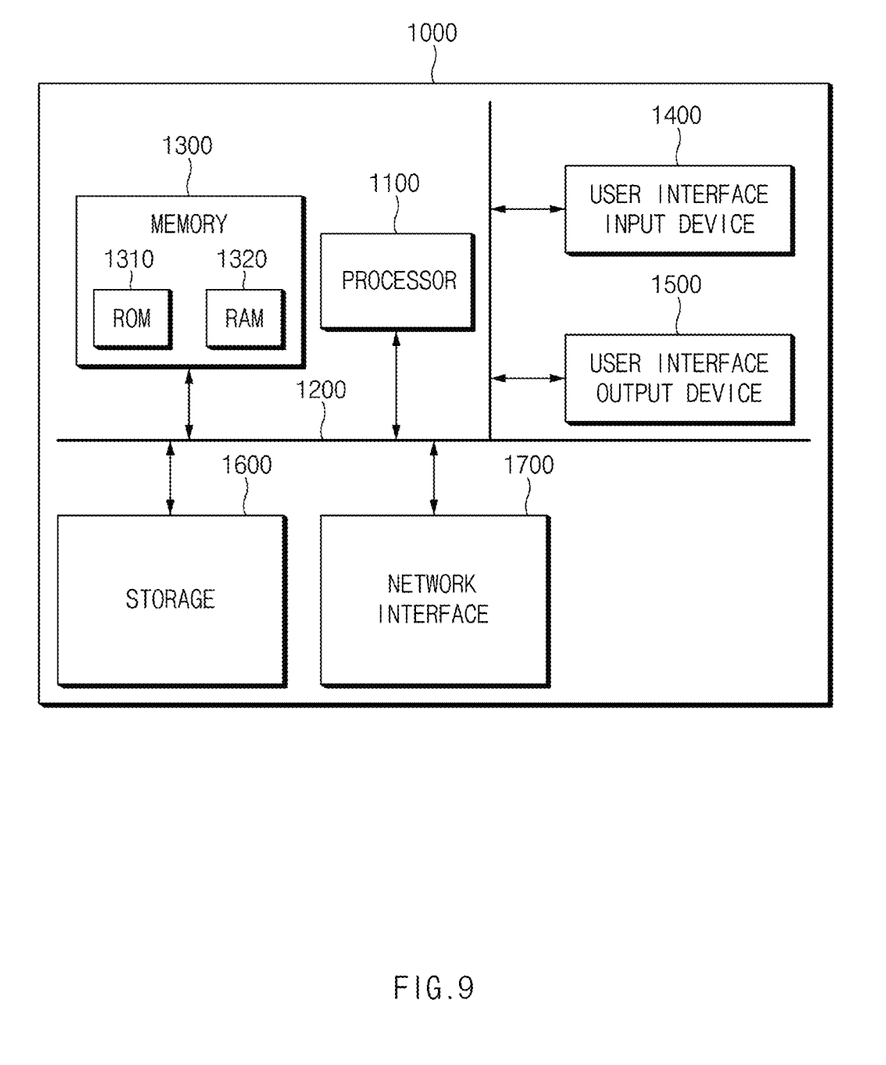
FIG. 9 is a diagram illustrating an example of a computing system.

FIG. 9 is a diagram illustrating an example of a computing system.

Referring to FIG. 9, a computing system 1000 may include at least one processor 1100, a memory 1300, a user interface input device 1400, a user interface output device 1500, a storage 1600, and a network interface 1700, which are connected with each other via a system bus 1200. The computing system 1000 described with reference to FIG. 9 may be at least partially applied to the vehicle 11 described with reference to FIGS. 1 to 3, and may be a computing system to execute a manner for providing an improved security function of the vehicle described with reference to FIG. 8.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM) (1320).

Thus, the operations of the methods or algorithms described in connection with the implementations disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to the present disclosure, the multiple persons are supported to simultaneously view the same content.

According to the present disclosure, the multiple persons are supported to use content through output devices held by the multiple persons under the specific condition, regardless of the type or the version of the output devices.

What is claimed is:

1. A vehicle comprising:
  a memory configured to store instructions and content; and
  a processor operatively connected to the memory and configured to execute the instructions to perform operations comprising:
  obtaining, based on a request being received to reproduce the content, delay characteristic information of a plurality of output devices by performing a scan operation;
  selecting a service group comprising a predetermined percentage of output devices that satisfy a specific delay characteristic value from among the plurality of output devices; and
  transmitting the content to the service group.

2. The vehicle of claim 1, wherein selecting the service group comprises:
  determining signal strengths of the plurality of output devices,
  selecting a service target group comprising one or more output devices having a signal strength greater than or equal to a preset reference strength, and
  selecting the service group from the service target group.

3. The vehicle of claim 2, wherein selecting the service target group comprises:
  selecting, as the specific delay characteristic value, a largest minimum value among the delay characteristic information of the output devices within the service target group, which ranges from the minimum value to the maximum value.

4. The vehicle of claim 3, wherein the operations further comprise:
  calculating a delay characteristic margin range value by applying a preset margin to the specific delay characteristic value, and
  determining output devices having delay characteristic values including at least a portion of the delay characteristic margin range value.

5. The vehicle of claim 4, wherein the operations further comprise:
  reselecting, as the specific delay characteristic value, a next largest minimum value among the delay characteristic information, based on a calculated percentage of a number of the output devices being less than a reference ratio.

6. The vehicle of claim 1, wherein transmitting the content comprises:
  transmitting (i) a decryption key to output devices within the service group and (ii) streaming the content.

7. The vehicle of claim 1, wherein transmitting the content comprises:
  based on the content being video content, transmitting the content by selecting the service group.

8. The vehicle of claim 1, wherein transmitting the content comprises:
  based on (i) an engine of the vehicle being turned on after being turned off or (ii) an input being received at the vehicle, transmitting the content by selecting the service group.

9. The vehicle of claim 1, wherein transmitting the content comprises:
  based on a request being received to reproduce new video content, transmitting the content by selecting the service group.

10. The vehicle of claim 1, wherein transmitting the content comprises:
  based on a passenger of the vehicle entering or exiting the vehicle, transmitting the content by selecting the service group.

11. A method comprising:
  receiving, by a processor of a vehicle, a request for reproducing content stored in a memory;
  performing, based on the request being received, a scan operation to obtain delay characteristic information of a plurality of output devices;
  selecting a service group comprising a predetermined percentage of output devices that satisfy a specific delay characteristic value from among the plurality of output devices; and
  transmitting the content to the service group.

12. The method of claim 11, wherein selecting the service group comprises:
  determining signal strengths of the plurality of output devices,
  selecting a service target group comprising one or more output devices having a signal strength greater than or equal to a preset reference strength, and
  selecting the service group among the service target group.

13. The method of claim 12, wherein selecting the predetermined percentage of output devices as the service group includes:

selecting, as the specific delay characteristic value, a largest minimum value from the delay characteristic information of the output devices within the service target group, which ranges from the minimum value to the maximum value.

14. The method of claim 13, further comprising:
calculating a delay characteristic margin range value by applying a preset margin to the specific delay characteristic value;
determining output devices having delay characteristic values including at least a portion of the delay characteristic margin range value; and
reselecting, as the specific delay characteristic value, a next largest minimum value among the delay characteristic information, based on a calculated percentage of a number of the output devices being less than a reference ratio.

15. The method of claim 11, wherein transmitting the content includes:
transmitting (i) a decryption key to output devices within the service group and (ii) streaming the content.

16. The method of claim 12, wherein transmitting the content includes:
based on the content being video content, transmitting the content by selecting the service group; and
based on the content being audio content, transmitting the audio content to an entire portion of the service target group.

17. The method of claim 11, wherein obtaining the delay characteristic information is performed based on (i) an engine of the vehicle being turned on after being turned off, (ii) an input being received at the vehicle, (iii) a request to reproduce new video content being received, or (iv) a passenger of the vehicle entering or exiting the vehicle.

18. A computing system of a vehicle, the computing system comprising:
a processor configured to support a vehicle operation; and
a memory configured to store at least one instruction to operate the processor,
wherein the at least instruction stored in the memory causes the processor to perform operations comprising:
receiving a request for reproducing content stored in the memory;
performing, based on the request being received, a scan operation to obtain delay characteristic information of a plurality of output devices;
selecting a service group comprising a predetermined percentage of output devices that satisfy a specific delay characteristic value from among the plurality of output devices; and
transmitting the content to the service group.

19. The computing system of claim 18, wherein selecting the service group comprises:
determining signal strengths of the plurality of output devices through the scan operation,
selecting, as a service target group, one or more output devices having a signal strength greater than or equal to a preset reference strength, and
selecting the service group among the service target group.

20. The computing system of claim 19, wherein transmitting the content comprises:
transmitting a decryption key to output devices belonging within the service group.

* * * * *